(12) United States Patent
Chern et al.

(10) Patent No.: US 9,703,016 B1
(45) Date of Patent: Jul. 11, 2017

(54) STRUCTURED LIGHT GENERATION MODULE

(71) Applicant: EVERREADY PRECISION IND. CORP., Kaohsiung (TW)

(72) Inventors: Jyh-Long Chern, Taipei (TW); Chih-Ming Yen, New Taipei (TW)

(73) Assignee: EVERREADY PRECISION IND. CORP., Kaohsiung (TW)

( * ) Notice: Subject to any disclaimer, the term of this patent is extended or adjusted under 35 U.S.C. 154(b) by 0 days.

(21) Appl. No.: 15/171,377

(22) Filed: Jun. 2, 2016

(30) Foreign Application Priority Data

Feb. 26, 2016 (CN) .......................... 2016 1 0107978
Feb. 26, 2016 (TW) .............................. 105105943 A

(51) Int. Cl.
*G02B 3/00* (2006.01)
*G02B 27/30* (2006.01)
*G02B 5/02* (2006.01)
*G02B 27/42* (2006.01)

(52) U.S. Cl.
CPC ........... *G02B 3/005* (2013.01); *G02B 5/0263* (2013.01); *G02B 5/0278* (2013.01); *G02B 27/30* (2013.01); *G02B 27/425* (2013.01)

(58) Field of Classification Search
CPC ...... G02B 3/005; G02B 27/30; G02B 5/0263; G02B 5/0278; G02B 27/425
See application file for complete search history.

(56) References Cited

U.S. PATENT DOCUMENTS

2017/0030190 A1\* 2/2017 Serres ..................... E21B 49/08
2017/0052287 A1\* 2/2017 Lee .......................... G02B 3/005

\* cited by examiner

*Primary Examiner* — Joseph L Williams
(74) *Attorney, Agent, or Firm* — Muncy, Geissler, Olds & Lowe, P.C.

(57) ABSTRACT

A structured light generation module includes a light source, a collimating optical element and a beam-diffusion optical element. The light source provides a source beam with a source beam size. After the source beam is collimated by the collimating optical element, a collimated light beam is generated. After the collimated light beam is diffused by the beam-diffusion optical element, a structured light with a beam diffusion angle relative to the collimated light beam is generated. The beam-diffusion optical element includes plural lenses, and the plural lenses are repeatedly distributed in one dimension. The pitches and the orientations of the lenses are specially designed. Consequently, the structured light generation module is capable of generating diversified structured light patterns.

20 Claims, 6 Drawing Sheets

STRUCTURED LIGHT GENERATION MODULE

FIELD OF THE INVENTION

The present invention relates to a structured light generation module, and more particularly to a structured light generation module for a wearable device or a mobile device.

BACKGROUND OF THE INVENTION

A wearable device with intelligent functions is one of the star products in the emergent market. Actually portable devices with intelligent function have been a part of daily life in human activity. Examples includes notebook PC, tablet, and smart phone. More amazing and attractive is that a wearable device with structured light module can provide more smart functions, mainly virtual interactive, to the users in a much more friendly and effective way for communications. For examples, the user can interact with surroundings through the wearable device or use the wearable device to detect the surroundings or communicate in a long distance way. This kind of extension of input-output interface is required particularly for a wearable device, since the real interface in wearable device is generally too small. As known, the ways of generating and receiving a structured light are very important to achieve the interacting and detecting functions. Consequently, the function of generating the structured light is essential for upgrading wearable devices, mobile devices or any other comparable virtual reality devices.

On the other hand, there are many types of structured light, including line, cross-line, dots, random dots, stripes, and a mixed form of several different structured light. With a wider demand of application, the range of structured light can be varied and a larger range is generally required. For example, a line-type of structured light may require a wide beam diffusion angle to have a wider access for mutual interactive. It is of interest to develop an applicable structured light with this kind of line type, say a beam diffusion angle larger than 90 degrees with a compact size sine this kind of structured light is needed to be embedded in a wearable device. One of the purposes of this article is to solve this issue. Besides, we also want to solve another issue which relates complex structured lighting. In the applications of structured light, complex structured light is also on demand. It is surely true that a complex structured light can be decomposed with a set of simpler structure. Unlike the structured light formed by dots, using line will be alternative approach.

SUMMARY OF THE INVENTION

For solving the drawbacks of the conventional technologies, the present invention provides a structured light generation module. The lenses of the structured light generation module are repeatedly distributed in one dimension. The pitches and the orientations of the lenses are specially designed. Consequently, the structured light generation module is capable of generating diversified structured light patterns.

For solving the drawbacks of the conventional technologies, the present invention provides a structured light generation module. The lenses of the structured light generation module are repeatedly distributed in one dimension. A collimating optical element and the lenses are cooperated to generate the structured light. In case that the collimating optical element, the lenses and the light source are installed on a casing, the overall volume of the structured light generation module is reduced.

In accordance with an aspect of the present invention, there is provided a structured light generation module. The structured light generation module includes a light source, a collimating optical element and a beam-diffusion optical element. The light source provides a source beam with a source beam size. After the source beam is collimated by the collimating optical element, a collimated light beam is generated. After the collimated light beam is diffused by the beam-diffusion optical element, a structured light with a beam diffusion angle relative to the collimated light beam is generated. The beam-diffusion optical element includes plural lenses, and the plural lenses are repeatedly distributed in one dimension. The plural lenses have corresponding pitches, and each pitch is smaller than the source beam size. The beam diffusion angle complies with mathematic formulae:

$$\theta = S \times \theta_n$$

$$\theta_n = -3.63 \times z^3 + 3.69 \times z^2 - 9.383 \times z + 103$$

wherein $z=(p-0.368)/0.0665$, p is the pitch in mm, S is a dimensionless zoom factor, $\theta$ is the beam diffusion angle in degree, and $\theta_n$ is the beam diffusion angle when the source beam has a nominal wavelength of 650 nm and the lens is made of polycarbonate.

In an embodiment, the structured light generation module further includes a casing. The light source, the collimating optical element and the beam-diffusion optical element are installed on the casing.

In an embodiment, the structured light generation module further includes a casing. At least one of the collimating optical element and the beam-diffusion optical element is integrated into the casing, and the light source, the collimating optical element and the beam-diffusion optical element are installed on the casing.

In an embodiment, the beam-diffusion optical element further includes a first surface with a convex profile. The convex profile is defined by the plural lenses collaboratively, and the first surface faces the collimating optical element. Alternatively, the beam-diffusion optical element further includes a first surface with a mixed convex profile. The mixed convex profile is defined by the plural lenses collaboratively, and the first surface faces the collimating optical element.

In an embodiment, the beam-diffusion optical element further includes a second surface, which is opposed to the first surface. The second surface is a flat surface, or the second surface is a flat surface with a reflective coating.

In an embodiment, the plural lenses on the first surface are arranged in a single orientation or plural different orientations. Moreover, orientations of the structured light corresponding to the plural lenses in the plural different orientations are different.

In an embodiment, the pitches are identical, gradually increased, gradually decreased, or different.

In an embodiment, the wavelength of the source beam is longer than 650 nm, and the zoom factor is in a range between 0 and 1.

In an embodiment, a refractive index of the beam-diffusion optical element is smaller than a refractive index of polycarbonate, and the zoom factor is in a range between 0 and 1.

In an embodiment, the wavelength of the source beam is 650 nm, the beam-diffusion optical element is made of polycarbonate, and the zoom factor is 1.

In accordance with another aspect of the present invention, there is provided a structured light generation module. The structured light generation module includes a light source, a collimating optical element and a beam-diffusion optical element. The light source provides a source beam with a source beam size. After the source beam is collimated by the collimating optical element, a collimated light beam is generated. After the collimated light beam is diffused by the beam-diffusion optical element, a structured light with a beam diffusion angle relative to the collimated light beam is generated. The beam-diffusion optical element includes plural lenses, and the plural lenses are repeatedly distributed in one dimension. The plural lenses have corresponding pitches. At least one effective focal length of the plural lenses is in a range between −0.15 and 0.15. A refractive index of the beam-diffusion optical element is in a range between 1.01 and 3.65. The beam diffusion angle complies with mathematic formulae:

$$\theta = 2 \times \tan^{-1}(p/(2 \times |f|))$$

wherein p is the pitch in mm, θ is a beam diffusion angle in degree, and |f| is an absolute value of the effective focal length.

In an embodiment, the structured light generation module further includes a casing, wherein the light source, the collimating optical element and the beam-diffusion optical element are installed on the casing. Alternatively, the structured light generation module further includes a casing, wherein at least one of the collimating optical element and the beam-diffusion optical element is integrated into the casing, and the light source, the collimating optical element and the beam-diffusion optical element are installed on the casing.

In an embodiment, the beam-diffusion optical element further includes a first surface a first surface with a concave profile. The concave profile is defined by the plural lenses collaboratively, and the first surface faces the collimating optical element. Alternatively, a first surface with a convex profile. The convex profile is defined by the plural lenses collaboratively, and the first surface faces the collimating optical element. Alternatively, a first surface with a mixed convex profile. The mixed convex profile is defined by the plural lenses collaboratively, and the first surface faces the collimating optical element. Alternatively, a first surface with a mixed concave profile. The mixed concave profile is defined by the plural lenses collaboratively, and the first surface faces the collimating optical element.

In an embodiment, the beam-diffusion optical element further comprises a second surface, which is opposed to the first surface. The second surface is a flat surface, or the second surface is a flat surface with a reflective coating.

In an embodiment, the plural lenses on the first surface are arranged in a single orientation or plural different orientations. Moreover, orientations of the structured light corresponding to the plural lenses in the plural different orientations are different.

In an embodiment, the beam-diffusion optical element further includes a flat transparent substrate. The plural lenses are fixed on the flat transparent substrate, and the second surface is provided by the flat transparent substrate.

In an embodiment, the pitches are identical, gradually increased, gradually decreased, or different.

In an embodiment, the beam-diffusion optical element includes an optical zone and a non-optical zone. The plural lenses are included in the optical zone, and the non-optical zone includes a fixing structure. The beam-diffusion optical element is fixed on a casing through the fixing structure.

In an embodiment, the collimating optical element is further fixed on the casing.

In an embodiment, the beam-diffusion optical element further includes a discontinuous zone between the plural lenses. A diffractive optical element is installed on the discontinuous zone of the beam-diffusion optical element.

From the above descriptions, the present invention provides a structured light generation module. Since the pitches of the lenses distributed in one dimension are specially designed, the structured light generation module can generate the desired structured light pattern. Moreover, in case that the orientations of the lenses are changed, the orientation of the structured light is correspondingly adjusted. Consequently, the structured light generation module is capable of generating diversified structured light patterns. Moreover, since the collimating optical element, the beam-diffusion optical element and the light source can be installed on a casing, the overall volume of the structured light generation module is reduced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

In this context, the term "diffractive optical element" is an optical element comprising an optical zone and a non-optical zone. The optical zone comprises an optical element for processing or converting the light beam from a light source. In contrast to the optical zone, the functions provided by the non-optical zone do not include the function of processing or converting the light beam. For example, the non-optical zone has a fixture or structure for providing a fixing function, or has a structure or a wiring region for providing a connecting function. It is noted that the non-optical zone can still have simple optical properties such as light-transmissible, light-refractive or light-reflective properties. Moreover, the optical zone comprises plural lenses. In some embodiments, these lenses are regularly duplicated and continuous. In some other embodiments, these lenses are regularly duplicated but discontinuous. In case that these lenses are regularly duplicated but discontinuous, one or plural additional optical elements (e.g., diffractive optical elements) can be arranged between these lenses. The additional optical elements such as the diffractive optical elements should comply with the features or restrictions of the lenses according to the present invention.

Figure 1:
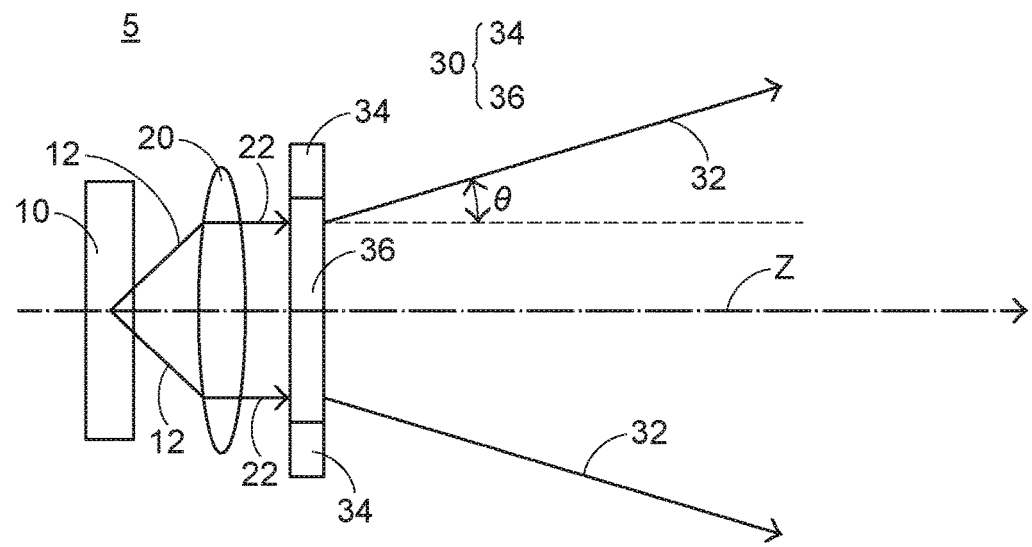
FIG. 1 is a schematic side view illustrating the architecture of a structured light generation module according to an embodiment of the present invention.

FIG. 1 is a schematic side view illustrating the architecture of a structured light generation module according to an embodiment of the present invention. As shown in FIG. 1, the structured light generation module 5 comprises a light source 10, a beam-diffusion optical element 30 and a collimating optical element 20. The collimating optical element 20 is arranged between the light source 10 and the beam-diffusion optical element 30. The line passing through an optical center of the collimating optical element 20 is defined as a primary optical axis Z. The light source 10 provides a source beam 12 with a source beam size. The collimating optical element 20 (e.g., a collimating lens and its lens holder) receives the source beam 12 and collimates the source beam 12. Consequently, a circular collimated light beam 22 is outputted from the collimating optical element 20. The collimated light beam 22 is substantially in parallel with the primary optical axis Z. The beam-diffusion optical element 30 receives the collimated light beam 22 and diffuses the collimated light beam 22. Consequently, a structured light 32 is generated. The structured light 32 is a linearized light beam with a beam diffusion angle. That is, the structured light 32 has a beam diffusion angle θ relative to the collimated light beam 22. In an embodiment, the collimating optical element 20 is a single collimating lens or a composite collimating lens. In this embodiment, the beam-diffusion optical element 30 comprises an optical zone 36 and one or plural non-optical zones 34. The optical zone 36 is used for diffusing the collimated light beam 22 so as to generate the structured light 32. The non-optical zones 34 may be designed to have other structures to provide other functions.

Figure 2:
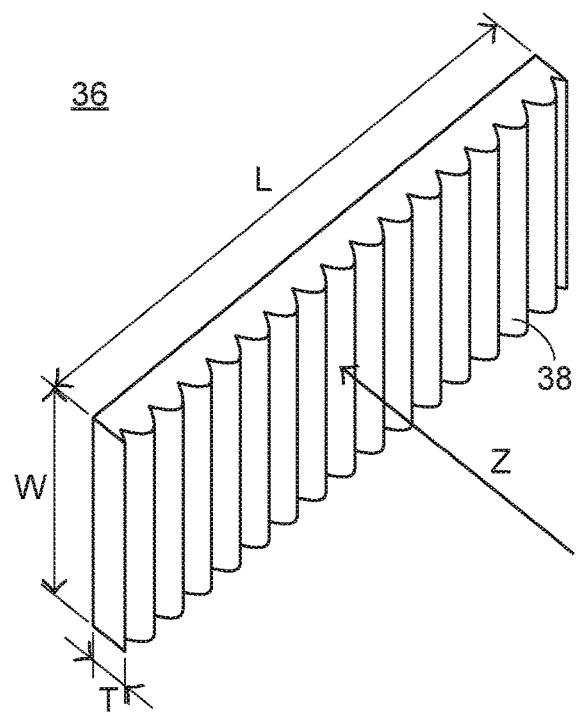
FIG. 2 is a schematic perspective view illustrating a portion of a beam-diffusion optical element according to a first embodiment the present invention.
Figure 3:
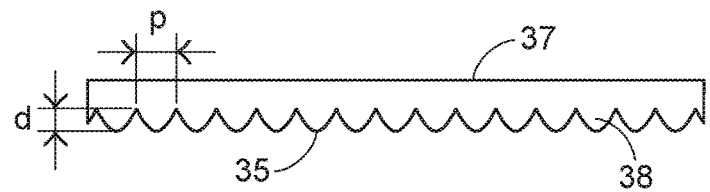
FIG. 3 is a schematic side view illustrating the beam-diffusion optical element of FIG. 2 and taken along a first side.
Figure 4:
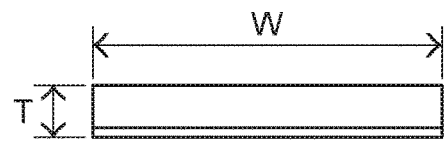
FIG. 4 is a schematic side view illustrating the beam-diffusion optical element of FIG. 2 and taken along a second side.

FIG. 2 is a schematic perspective view illustrating a portion of a beam-diffusion optical element according to a first embodiment the present invention. FIG. 3 is a schematic side view illustrating the beam-diffusion optical element of FIG. 2 and taken along a first side. FIG. 4 is a schematic side view illustrating the beam-diffusion optical element of FIG. 2 and taken along a second side. Please refer to FIGS. 1, 2, 3 and 4. The beam-diffusion optical element 30 is perpendicular to the primary optical axis Z. In the optical zone 36 of the beam-diffusion optical element 30, the extending direction of the length L and the extending direction of the width W are both perpendicular to the primary optical axis Z, and the thickness T extends along the primary optical axis Z. Moreover, the length L and the width W are much larger than the thickness T. The beam-diffusion optical element 30 comprises plural lenses 38, wherein each lens 38 has a pitch p. These lenses 38 are repeatedly distributed in one dimension so as to constitute a part or an entire of the optical zone 36 of the beam-diffusion optical element 30. For example, as shown in FIGS. 2 and 3, plural lenses 38 are distributed along the extending direction of the length L. Moreover, as shown in FIGS. 3 and 4, there is only one lens 38 along the extending direction of the width W and the extending direction of the thickness T. In practice, the plural lenses 38 are integrally with each other by using a single material, the plural lenses 38 are integrally formed with each other by using a composite material, or the plural lenses 38 are combined together by using a composite material. Moreover, the beam-diffusion optical element 30 further comprises the non-optical zone 34. The optical zone 36 and the non-optical zone 34 are integrally formed by using a single material, the optical zone 36 and the non-optical zone 34 are integrally formed by using a composite material, or the optical zone 36 and the non-optical zone 34 are combined together by using a composite material.

Moreover, each of the lenses 38 has a spherical surface or an aspherical surface. A convex profile is defined by the plural lenses 38 collaboratively. In other words, the beam-diffusion optical element 30 comprises a first surface 35 with the convex profile. The first surface 35 is also the surface of the optical zone 36. The collimated light beam 22 is introduced into the beam-diffusion optical element 30 through the first surface 35. Moreover, the surface of each lens 38 opposed to the spherical surface or the aspherical surface is a flat surface. That is, the beam-diffusion optical element 30 comprises a second surface 37 opposed to the first surface 35. The second surface 37 is a flat surface. Optionally, a reflective coating is formed on the second surface 37 of the optical zone 36 of the beam-diffusion optical element 30. The area of the reflective coating is equal to or larger than the optical zone 36.

Moreover, the distribution and geometric shape of the lenses 38 in the optical zone 36 are specially designed. Consequently, the collimated light beam 22 is diffused by the lenses 38, and the structured light with the beam diffusion angle θ is generated. The beam diffusion angle θ complies with following mathematic formulae:

$$\theta = S \times \theta_n$$

$$\theta_n = -3.63 \times z^3 + 3.69 \times z^2 - 9.383 \times z + 103$$

Figure 5:
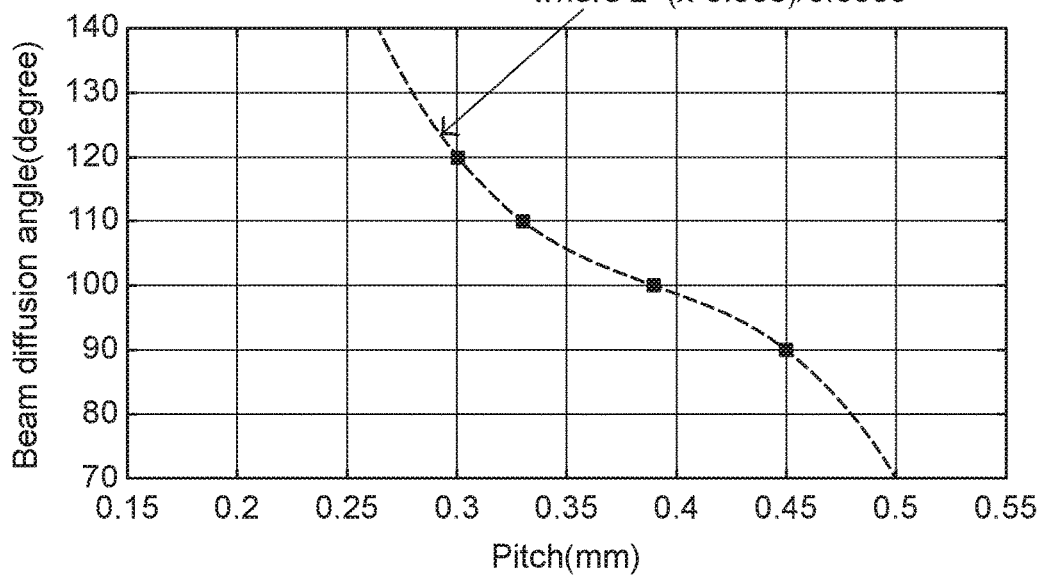
FIG. 5 is a plot illustrating the relationship between the pitch of the lens and the beam diffusion angle.

In the above mathematic formulae, $z=(p-0.368)/0.0665$, p is the pitch (mm) of the lens, S is a dimensionless zoom factor, θ is a beam diffusion angle (degree), and $\theta_n$ is a beam diffusion angle when the source beam 12 has a nominal wavelength of 650 nm and the lens 38 is made of polycarbonate. The relationship between the pitch of the lens and the beam diffusion angle is shown in FIG. 5. Please refer to FIGS. 1~5. The nominal wavelength of the source beam 12 is 650 nm, and the depth d of the lens 38 is a fixed value (e.g., 0.22 mm) After the source beam 12 passes through the collimating optical element 20, the collimated light beam 22 is formed, wherein a beam size of the collimated light beam 22 is larger than the pitch p. In case that the pitches p are 0.3, 0.33, 0.39 and 0.45, the corresponding beam diffusion angles are respectively 120, 110, 100 and 90 degrees according to the mathematic formulae and the plot of FIG. 5. If the wavelength of the source beam 12 is longer than 650 nm, the zoom factor S is in the range between 0 and 1. As the wavelength of the source beam is longer, the beam diffusion angle is smaller when the pitch p is fixed. Moreover, if the refractive index of the beam-diffusion optical element 30 is smaller than the refractive index of polycarbonate, the zoom factor S is in the range between 0 and 1. That is, if the refractive index of the beam-diffusion optical element 30 is smaller than the refractive index of polycarbonate, the beam diffusion angle is smaller when the pitch p is fixed. On the other hand, if the wavelength of the source beam 12 is longer than 650 nm or the beam-diffusion optical element 30 is larger than the refractive index of polycarbonate, the zoom factor S is larger than 1.

Figure 6:
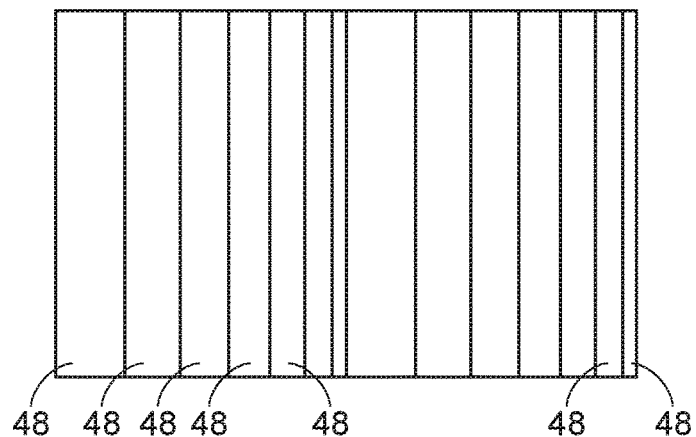
FIG. 6 is a schematic front view illustrating a portion of a beam-diffusion optical element according to a second embodiment the present invention.

In this embodiment, the pitch p has a single value. That is, the pitches of these lenses 38 are identical. Moreover, the geometric sizes of these lenses 38 are identical. It is noted that numerous modifications and alterations may be made while retaining the teachings of the invention. FIG. 6 is a schematic front view illustrating a portion of a beam-diffusion optical element according to a second embodiment the present invention. As shown in FIG. 6, the optical zone 46 of the beam-diffusion optical element comprises plural lenses 48. The pitches of these lenses 48 are gradually increased or gradually decreased, and the geometric sizes of these lenses 48 are gradually increased or gradually decreased. It is noted that the gradually-increased pitches or the gradually-decreased pitches may be repeatedly distributed in the optical zone 46. Moreover, the plural lenses 48 with the gradually-increased pitches or the gradually-decreased pitches collaboratively define a convex profile in the optical zone 46. In other words, the beam-diffusion optical element comprises a first surface with the convex profile. In particular, the first surface comprises a mixed convex profile that is composed of plural convex structures with different curvatures.

Figure 7:
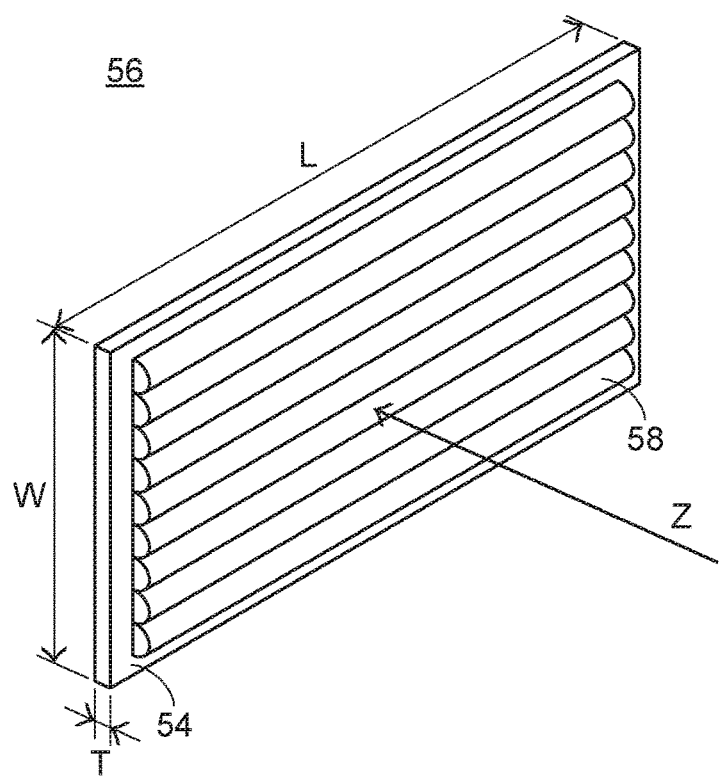
FIG. 7 is a schematic perspective view illustrating a portion of a beam-diffusion optical element according to a third embodiment the present invention.

FIG. 7 is a schematic perspective view illustrating a portion of a beam-diffusion optical element according to a third embodiment the present invention. In comparison with the first embodiment of FIG. 2, the plural lenses 58 in the optical zone 56 are distributed along the extending direction of the width W. That is, the orientations of the plural lenses 58 perpendicular to the primary optical axis Z are different from those of the first embodiment. Moreover, the optical zone 56 further comprises a flat transparent substrate 54 for supporting these lenses 58. That is, the optical zone 56 of the beam-diffusion optical element is made of a composite material, or the optical zone 56 of the beam-diffusion optical element is formed by laminating plural material layers. Moreover, for calculating the beam diffusion angle θ, the effective focal lengths f of the lenses are also taken into consideration. Preferably, at least one effective focal length f of the lenses 58 is in the range between −0.15 and 0.15, and a refractive index of the beam-diffusion optical element is in the range between 1.01 and 3.65. The beam diffusion angle θ complies with following mathematic formula:

$$\theta = 2 \times \tan^{-1}(p/(2 \times |f|))$$

In the above mathematic formula, p is the pitch (mm) of the lens, θ is a beam diffusion angle (degree), and |f| is an absolute value of the effective focal length.

Figure 8:
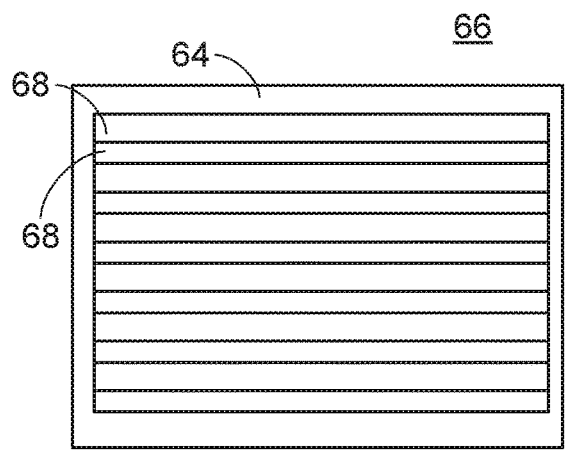
FIG. 8 is a schematic front view illustrating a portion of a beam-diffusion optical element according to a fourth embodiment the present invention.

FIG. 8 is a schematic front view illustrating a portion of a beam-diffusion optical element according to a fourth embodiment the present invention. In comparison with the third embodiment of FIG. 7, the optical zone 66 comprises two kinds of lenses 68 with different sizes and different effective focal lengths. These two kinds of lenses 68 are alternately distributed on a flat transparent substrate 64. After the pitch p and the effective focal length f are substituted into the mathematic formula: θ=2×tan⁻¹(p/(2×|f|)), the beam diffusion angles θ corresponding to the lenses 68 with different geometric sizes are calculated. The beam diffusion angles θ comply with following mathematic formulae:

$$\theta_a = 2 \times \tan^{-1}(p_a/(2 \times |f_a|))$$

$$\theta_b = 2 \times \tan^{-1}(p_b/(2 \times |f_b|))$$

In the above mathematic formulae, $p_a$ and $p_b$ are different pitches (mm), $f_a$ and $f_b$ are different effective focal lengths, and $\theta_a$ and $\theta_b$ are the corresponding beam diffusion angles.

Figure 9:
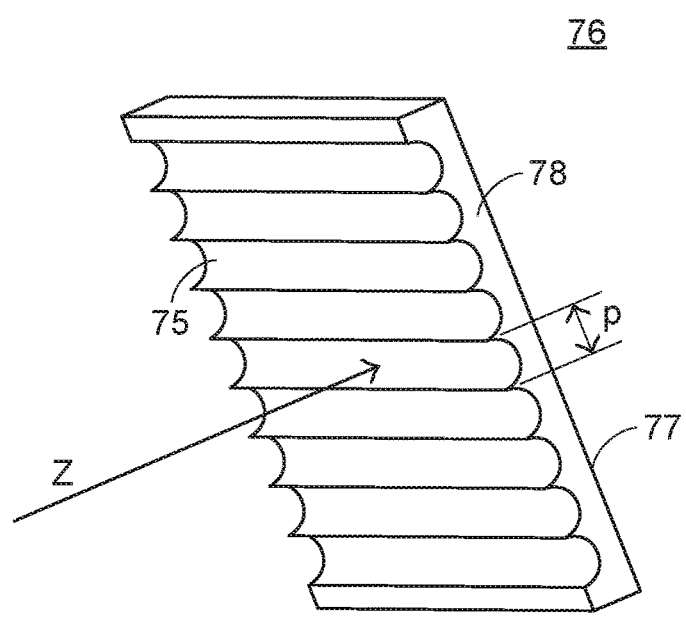
FIG. 9 is a schematic perspective view illustrating a portion of a beam-diffusion optical element according to a fifth embodiment the present invention.

FIG. 9 is a schematic perspective view illustrating a portion of a beam-diffusion optical element according to a fifth embodiment the present invention. In comparison with the first embodiment of FIG. 2, the plural lenses 78 in the optical zone 76 of the beam-diffusion optical element are plano-concave lenses. Under this circumstance, a first surface 75 of the beam-diffusion optical element has a concave profile, and a second surface 77 of the beam-diffusion optical element is a flat surface. Moreover, the effective focal lengths f of the plano-concave lenses 78 are negative. The beam diffusion angle θ is calculated according to the mathematic formula: θ=2*tan⁻¹(p/(2*|f|)). It is noted that numerous modifications and alterations may be made while retaining the teachings of the invention. For example, in another embodiment, the plano-concave lenses with different effective focal lengths f or different pitches p are repeatedly arranged in the optical zone. Moreover, like the above plano-convex lenses, different effective focal lengths f of the plano-concave lenses can be acquired by using different materials, different wavelengths or different temperatures.

Figure 10:
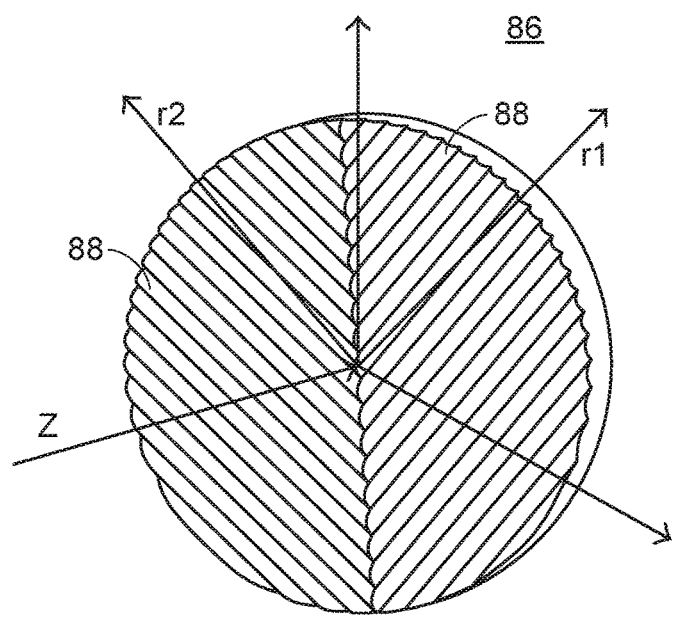
FIG. 10 is a schematic perspective view illustrating a portion of a beam-diffusion optical element according to a sixth embodiment the present invention.

FIG. 10 is a schematic perspective view illustrating a portion of a beam-diffusion optical element according to a sixth embodiment the present invention. In this embodiment, the pitches of the plural lenses 88 in the optical zone 86 of the beam-diffusion optical element are identical. In comparison with the first embodiment of FIG. 2, the plural lenses 88 are arranged in two different orientations r1 and r2, and the optical zone 86 is disk-shaped. By means of the plural lenses 88 in the two different orientations r1 and r2, the beam diffusion angles θ in two or more than two orientations can be obtained.

Figure 11:
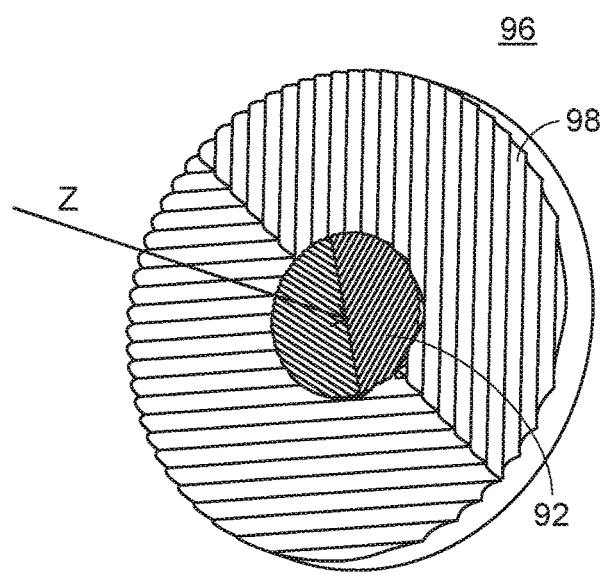
FIG. 11 is a schematic perspective view illustrating a portion of a beam-diffusion optical element according to a seventh embodiment the present invention.

FIG. 11 is a schematic perspective view illustrating a portion of a beam-diffusion optical element according to a seventh embodiment the present invention. In comparison with the sixth embodiment of FIG. 10, the pitches of the lenses 92 and 98 in the optical zone 96 of the beam-diffusion optical element are different. Moreover, the lenses 92 and 98 with different pitches are arranged in identical or different orientations, and the detailed descriptions thereof are omitted.

Figure 12:
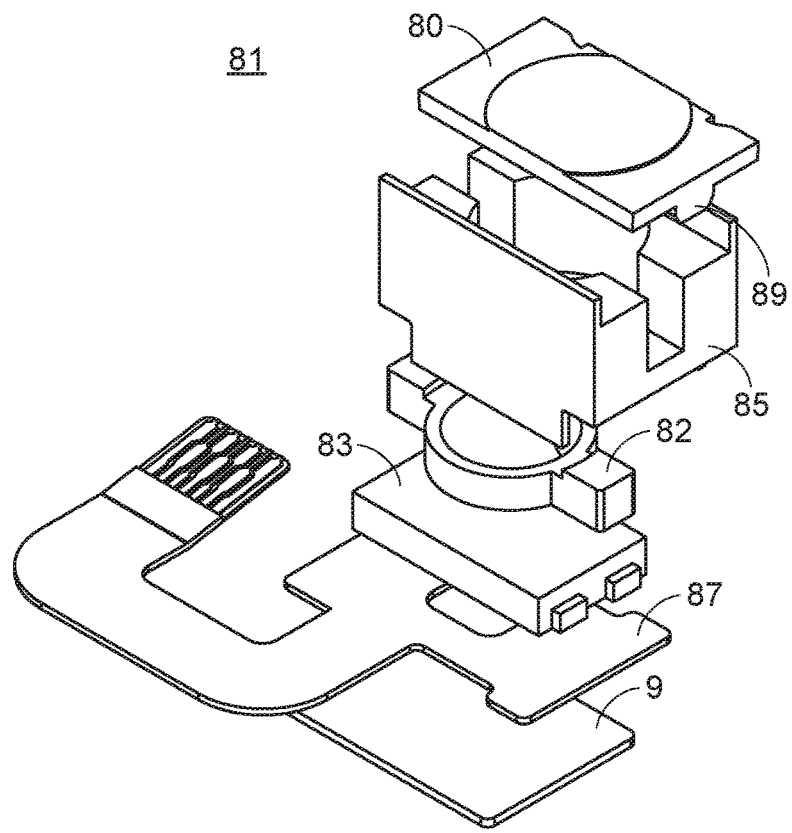
FIG. 12 is a schematic exploded view illustrating a portion of the structured light generation module according to the embodiment the present invention.

FIG. 12 is a schematic exploded view illustrating a portion of the structured light generation module according to the embodiment the present invention. As shown in FIG. 12, the structured light generation module 81 comprises a light source 83, a flexible circuit board 87, a heat dissipation plate 9, a casing 85, a collimating optical element 82 and a beam-diffusion optical element 80. The flexible circuit board 87 is connected with the light source 83. In this embodiment, the beam-diffusion optical element 80 comprises a fixing structure 89. The beam-diffusion optical element 80 is fixed on the casing 85 through the fixing structure 89. Moreover, the fixing structure 89 is located at the non-optical zone of the beam-diffusion optical element 80. Moreover, the casing 85 may further comprise a structure for fixing the collimating optical element 82. Consequently, the light source 83, the heat dissipation plate 9, the flexible circuit board 87, the collimating optical element 82 and the beam-diffusion optical element 80 are installed on the casing 85. In some embodiments, a part of the collimating optical element 82 and a part of the beam-diffusion optical element 80 are integrated into the casing 85 and used as parts of the casing 85.

Figure 13:
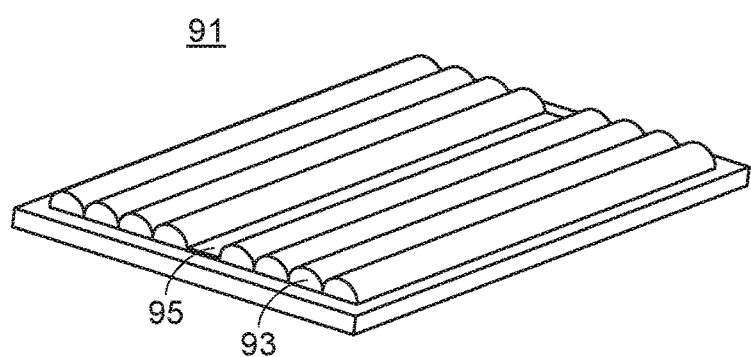
FIG. 13 is a schematic perspective view illustrating a portion of a beam-diffusion optical element according to an eighth embodiment the present invention.

FIG. 13 is a schematic perspective view illustrating a portion of a beam-diffusion optical element according to an eighth embodiment the present invention. In comparison with the third embodiment of FIG. 7, the plural lenses 93 in the optical zone 91 of the beam-diffusion optical element are regularly duplicated but discontinuous. In addition, a diffractive optical element 95 is formed or interposed between the plural lenses 93. In this embodiment, the diffractive optical element 95 is equivalent to a single lens 93. In other words, the diffractive optical element 95 also has an effective focal length. The mathematic formula for calculating the beam diffusion angle θ that is described in the third embodiment of FIG. 7 is also feasible to calculate the beam diffusion angle θ of the diffractive optical element 95.

From the above descriptions, the present invention provides a structured light generation module. Since the pitches of the lenses distributed in one dimension are specially designed, the structured light generation module can generate the desired structured light pattern. Moreover, in case that the orientations of the lenses are changed, the orientation of the structured light is correspondingly adjusted. Consequently, the structured light generation module is capable of generating diversified structured light patterns.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A structured light generation module, comprising:
a light source providing a source beam with a source beam size;
a collimating optical element, wherein after the source beam is collimated by the collimating optical element, a collimated light beam is generated; and
a beam-diffusion optical element, wherein after the collimated light beam is diffused by the beam-diffusion optical element, a structured light with a beam diffusion angle relative to the collimated light beam is generated, wherein the beam-diffusion optical element comprises plural lenses, and the plural lenses are repeatedly distributed in one dimension, wherein the plural lenses have corresponding pitches, and each pitch is smaller than the source beam size, wherein the beam diffusion angle complies with mathematic formulae:

$\theta = S \times \theta_n$ $\theta_n = -3.63 \times z^3 + 3.69 \times z^2 - 9.383 \times z + 103$ wherein $z = (p - 0.368)/0.0665$, p is the pitch in mm, S is a dimensionless zoom factor, θ is the beam diffusion angle in degree, and $\theta_n$ is the beam diffusion angle when the source beam has a nominal wavelength of 650 nm and the lens is made of polycarbonate.

2. The structured light generation module according to claim 1, further comprising a casing, wherein the light source, the collimating optical element and the beam-diffusion optical element are installed on the casing.

3. The structured light generation module according to claim 1, further comprising a casing, wherein at least one of the collimating optical element and the beam-diffusion optical element is integrated into the casing, and the light source, the collimating optical element and the beam-diffusion optical element are installed on the casing.

4. The structured light generation module according to claim 1, wherein the beam-diffusion optical element further comprises:
a first surface with a convex profile, wherein the convex profile is defined by the plural lenses collaboratively, and the first surface faces the collimating optical element; or
a first surface with a mixed convex profile, wherein the mixed convex profile is defined by the plural lenses collaboratively, and the first surface faces the collimating optical element.

5. The structured light generation module according to claim 4, wherein the beam-diffusion optical element further comprises a second surface, which is opposed to the first surface, wherein the second surface is a flat surface, or the second surface is a flat surface with a reflective coating.

6. The structured light generation module according to claim 4, wherein the plural lenses on the first surface are arranged in a single orientation or plural different orientations, wherein orientations of the structured light corresponding to the plural lenses in the plural different orientations are different.

7. The structured light generation module according to claim 1, wherein the pitches are identical, gradually increased, gradually decreased, or different.

8. The structured light generation module according to claim 1, wherein the wavelength of the source beam is longer than 650 nm, and the zoom factor is in a range between 0 and 1.

9. The structured light generation module according to claim 1, wherein a refractive index of the beam-diffusion optical element is smaller than a refractive index of polycarbonate, and the zoom factor is in a range between 0 and 1.

10. The structured light generation module according to claim 1, wherein the wavelength of the source beam is 650 nm, the beam-diffusion optical element is made of polycarbonate, and the zoom factor is 1.

11. A structured light generation module, comprising:
a light source providing a source beam with a source beam size;
a collimating optical element, wherein after the source beam is collimated by the collimating optical element, a collimated light beam is generated; and
a beam-diffusion optical element, wherein after the collimated light beam is diffused by the beam-diffusion optical element, a structured light with a beam diffusion angle relative to the collimated light beam is generated, wherein the beam-diffusion optical element comprises plural lenses, and the plural lenses are repeatedly distributed in one dimension, wherein the plural lenses have corresponding pitches, at least one effective focal length of the plural lenses is in a range between −0.15 and 0.15, and a refractive index of the beam-diffusion optical element is in a range between 1.01 and 3.65, wherein the beam diffusion angle complies with mathematic formulae:

$$\theta = 2 \times \tan^{-1}(p/(2 \times |f|))$$

wherein p is the pitch in mm, θ is a beam diffusion angle in degree, and |f| is an absolute value of the effective focal length.

12. The structured light generation module according to claim 11, wherein the structured light generation module further comprises:
   a casing, wherein the light source, the collimating optical element and the beam-diffusion optical element are installed on the casing; or
   a casing, wherein at least one of the collimating optical element and the beam-diffusion optical element is integrated into the casing, and the light source, the collimating optical element and the beam-diffusion optical element are installed on the casing.

13. The structured light generation module according to claim 11, wherein the beam-diffusion optical element further comprises:
   a first surface with a concave profile, wherein the concave profile is defined by the plural lenses collaboratively, and the first surface faces the collimating optical element; or
   a first surface with a convex profile, wherein the convex profile is defined by the plural lenses collaboratively, and the first surface faces the collimating optical element; or
   a first surface with a mixed convex profile, wherein the mixed convex profile is defined by the plural lenses collaboratively, and the first surface faces the collimating optical element; or
   a first surface with a mixed concave profile, wherein the mixed concave profile is defined by the plural lenses collaboratively, and the first surface faces the collimating optical element.

14. The structured light generation module according to claim 13, wherein the beam-diffusion optical element further comprises a second surface, which is opposed to the first surface, wherein the second surface is a flat surface, or the second surface is a flat surface with a reflective coating.

15. The structured light generation module according to claim 13, wherein the plural lenses on the first surface are arranged in a single orientation or plural different orientations, wherein orientations of the structured light corresponding to the plural lenses in the plural different orientations are different.

16. The structured light generation module according to claim 14, wherein the beam-diffusion optical element further comprises a flat transparent substrate, wherein the plural lenses are fixed on the flat transparent substrate, and the second surface is provided by the flat transparent substrate.

17. The structured light generation module according to claim 11, wherein the pitches are identical, gradually increased, gradually decreased, or different.

18. The structured light generation module according to claim 11, wherein the beam-diffusion optical element comprises an optical zone and a non-optical zone, wherein the plural lenses are included in the optical zone, and the non-optical zone comprises a fixing structure, wherein the beam-diffusion optical element is fixed on a casing through the fixing structure.

19. The structured light generation module according to claim 18, wherein the collimating optical element is further fixed on the casing.

20. The structured light generation module according to claim 11, wherein the beam-diffusion optical element further comprises a discontinuous zone between the plural lenses, wherein a diffractive optical element is installed on the discontinuous zone of the beam-diffusion optical element.

* * * * *